United States Patent
Baskaran et al.

(10) Patent No.: US 11,063,830 B2
(45) Date of Patent: Jul. 13, 2021

(54) HITLESS UPGRADE OF PACKET PROCESSING RULES

(71) Applicant: Arista Networks, Inc., Santa Clara, CA (US)

(72) Inventors: Eswaran Baskaran, Los Altos, CA (US); Ramakrishna Paduvalli, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 205 days.

(21) Appl. No.: 16/453,964

(22) Filed: Jun. 26, 2019

(65) Prior Publication Data

US 2020/0412615 A1 Dec. 31, 2020

(51) Int. Cl.
*G06F 15/177* (2006.01)
*H04L 12/24* (2006.01)
*G06N 5/02* (2006.01)

(52) U.S. Cl.
CPC ......... *H04L 41/0893* (2013.01); *G06N 5/025* (2013.01); *H04L 41/082* (2013.01)

(58) Field of Classification Search
CPC .......................... H04L 41/0893; H04L 41/082
USPC .......................................................... 709/221
See application file for complete search history.

(56) References Cited

U.S. PATENT DOCUMENTS

| | | | | |
|---|---|---|---|---|
| 6,970,462 B1 * | 11/2005 | McRae | ............... | H04L 41/0893 370/392 |
| 8,090,901 B2 * | 1/2012 | Lin | .................... | H04L 45/7457 711/108 |
| 8,750,144 B1 * | 6/2014 | Zhou | ..................... | H04L 45/54 370/252 |
| 10,129,088 B2 * | 11/2018 | Sharma | ................. | H04L 63/101 |
| 2003/0225965 A1 * | 12/2003 | Krishnan | ............ | H04L 45/7453 711/108 |
| 2005/0102686 A1 * | 5/2005 | Hariharan | ........... | H04L 12/2801 719/328 |
| 2009/0279549 A1 * | 11/2009 | Ramanathan | ............. | G06F 8/61 370/395.4 |

FOREIGN PATENT DOCUMENTS

WO WO-2017219842 A1 * 12/2017 ........... H04L 45/742

OTHER PUBLICATIONS

Norige et al., A Ternary Unification Framework for Optimizing TCAM-Based Packet Classification Systems, Apr. 2018, IEEE, All pages (Year: 2018).*

(Continued)

*Primary Examiner* — Hee Soo Kim
(74) *Attorney, Agent, or Firm* — Fountainhead Law Group P.C.

(57) ABSTRACT

Upgrading packet processing rules in a network device with a replacement set of rules includes generating an edit sequence that represents edit operations to transform an already-installed old set of rules into the replacement rules. The edit sequence is used to identify a subsequence of rules that is common to both the old rules and the replacement rules. A merged list is generated by a combination of the old rules, the replacement rules, and the common subsequence of rules. The merged list is downloaded to the network device, overwriting the old rules in bottom-up fashion allowing packet processing to continue concurrently using the old rules.

20 Claims, 15 Drawing Sheets

(56) References Cited

OTHER PUBLICATIONS

Shah et al., Fast updating algorithms for TCAM, IEEE Micro (vol. 21, Issue: 1, pp. 36-47) (Year: 2001).*
Chang et al., TCAM-Based Multi-Match Packet Classification Using Multidimensional Rule Layering, IEEE Apr. 1, 2016, All pages (Year: 2016).*

* cited by examiner

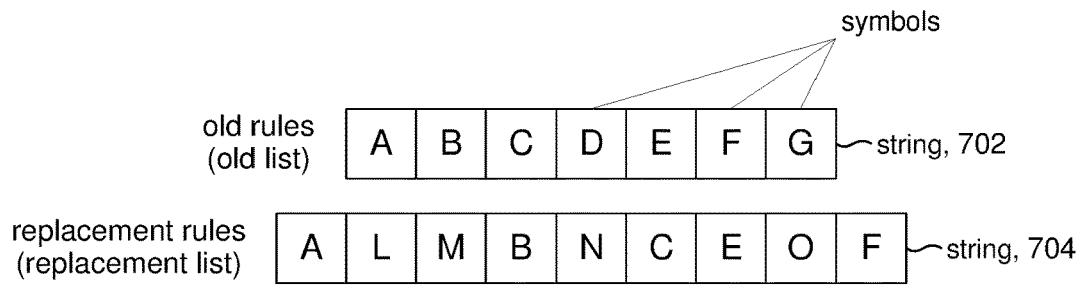
FIG. 7A
X | src-ip = 0/0, dst-ip = 12.1.0.0/0xff.ff.0.0, protocol = 0/0, ttl = 0/0, V-bit = 0, PERMIT
Y | src-ip = 0/0, dst-ip = 12.1.0.0/0xff.ff.0.0, protocol = 0/0, ttl = 0/0 V-bit = 0, DROP
Z | src-ip = 0/0, dst-ip = 12.1.0.0/0xff.ff.0.0, protocol = 0/0, ttl = 0/0 V-bit = 1, PERMIT
FIG. 7B
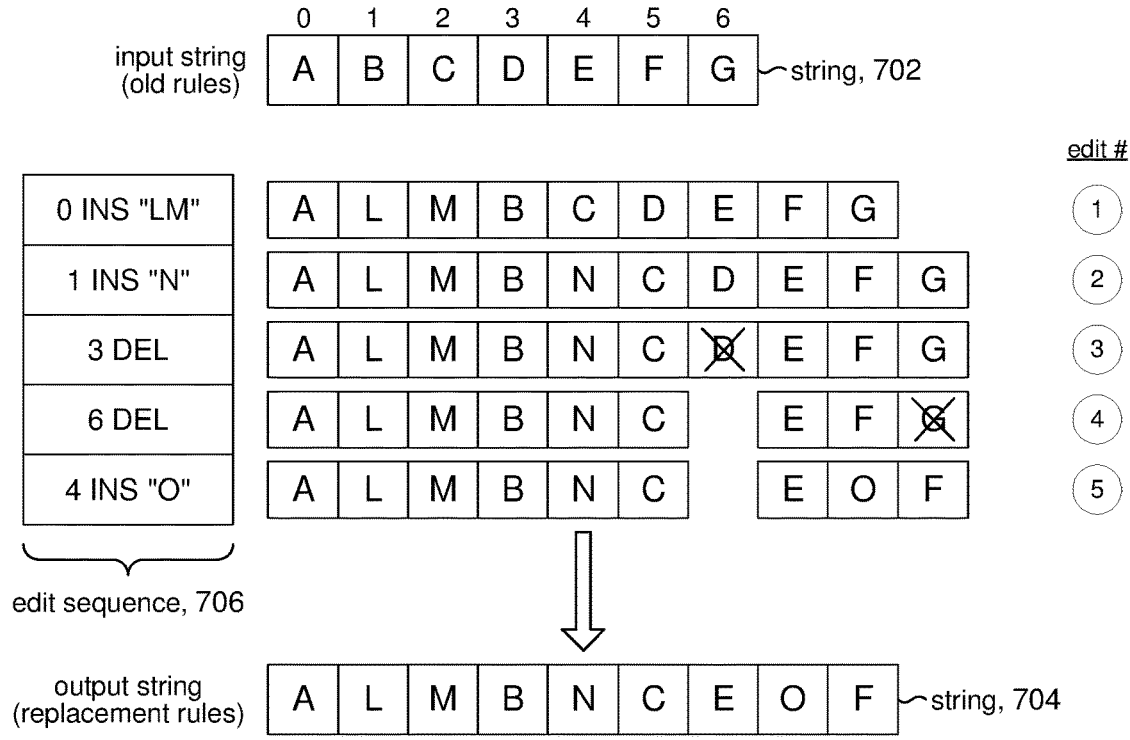
FIG. 7C

US 11,063,830 B2

HITLESS UPGRADE OF PACKET PROCESSING RULES

BACKGROUND

Network devices typically use some type of content-addressable memory (CAM) to express packet classifiers (packet processing rules) and associated actions to process packets. The use of CAM technology allows for high throughput processing of packets. A commonly used type of CAM is a ternary CAM (TCAM) because its three data state memory can provide wildcard capability for matching packets.

When edits have to be made to the rules, users want to be able to install the updates to the network device "hitlessly"; in other words, without impacting ongoing processing of packets in the network device.

SUMMARY

Embodiments in accordance with the present disclosure disclose replacement of packet processing rules (first list of rules) already installed in a network device with replacement rules (second list of rules). In some embodiments, a subsequence of rules common to both the first list and the second list can be identified, wherein every rule in the subsequence occurs in both the first list and the second list and the rules in the subsequence occur in the same order as in the first list and in the second list. A merged list of rules can be created by combining rules in the first list with rules in the second list that are not also in the subsequence. The merged list of rules can be installed (written) into the memory of the network device.

In some embodiments, the merged list of rules can be installed into a second portion of the memory of the network device that overlaps with a first portion of the memory that stores the first list of rules. In some embodiments, the merged list of rules can be installed into the second portion of the memory of the network device in bottom-up order starting from a bottom of the second portion of the memory.

In some embodiments, rules in the installed merged list that are unique to the first list can be deleted, leaving only rules that belong to the second list, thus effecting replacement of the first list of rules. In some embodiments, deleting rules in the installed merged list can include deleting rules that occur only in the first list in top-down order.

In some embodiments, rules in the subsequence do not occur contiguously in either or both the first list and the second list.

In some embodiments, an edit sequence comprising INSERT and DELETE operations to transform the first list into the second list can be generated, wherein the subsequence of rules is based on the edit sequence. In some embodiments, the DELETE operations in the edit sequence can be used to identify the subsequence of rules in the first list.

In some embodiments, rules in the merged list that are unique to the first list are identified by a first indicator, rules in the merged list that are unique to the second list are identified by a second indicator, and rules in the merged list that are unique to the subsequence are identified by a third indicator. The matching of incoming packets while installing the merged list can include matching the incoming packets only with rules that are identified with the first and third indicators.

In some embodiments, the merged list of rules has a size smaller than the combined size of the first list and the second list.

In some embodiments, the memory of the network device is a ternary content addressable memory (TCAM).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 7A 7B, 7C show examples of rules and an edit sequence in connection with the processing described in FIG. 6.

DETAILED DESCRIPTION

Figure 1:
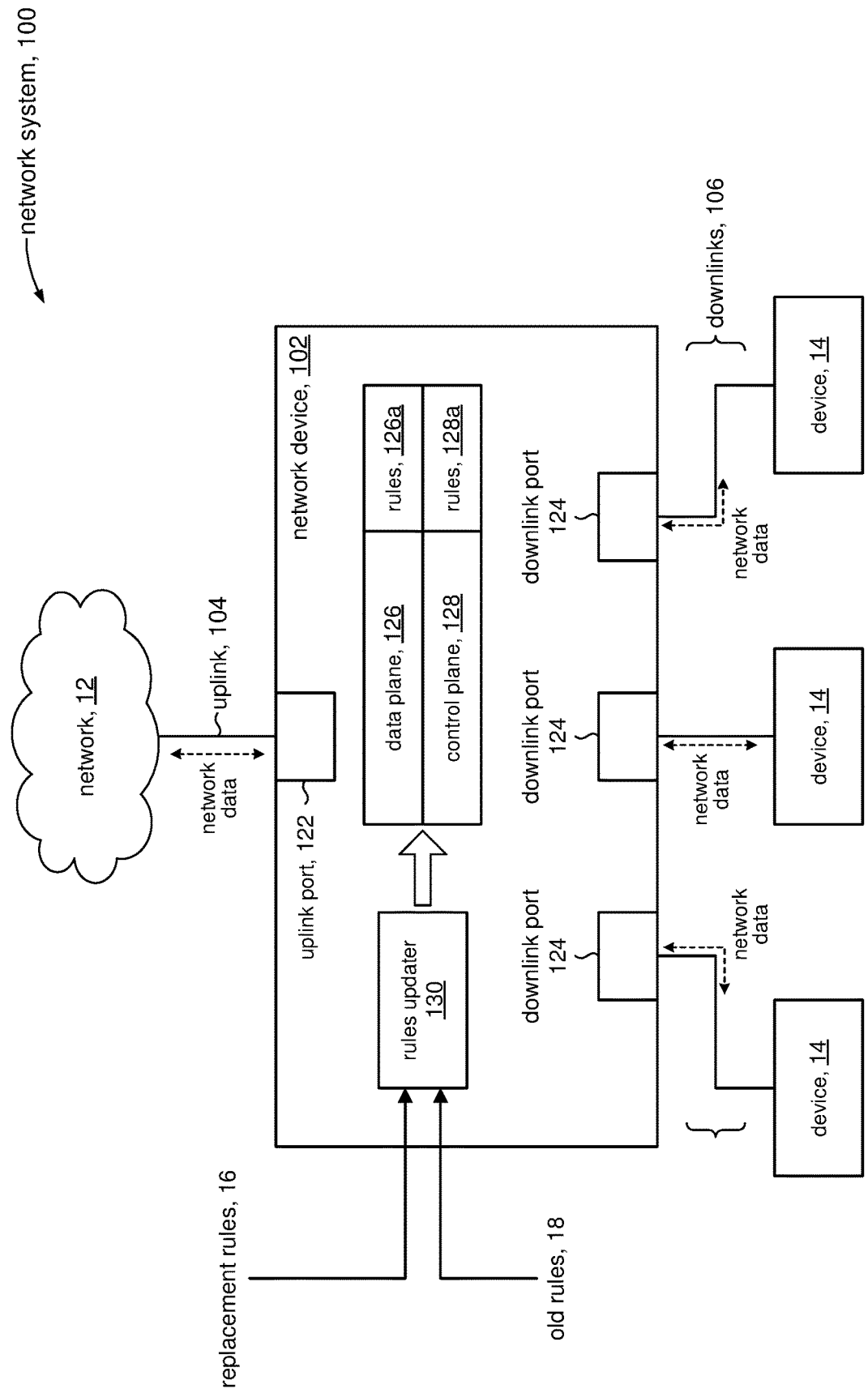
FIG. 1 illustrates a system block diagram of a network device in accordance with some embodiments.

An approach for hitlessly updating packet processing rules is sometimes referred to as make-before-break. This approach takes advantage of the availability of an atomically updatable data bit that can be included in the underlying TCAM hardware. Version bits can be incorporated in the rules, and the atomically updatable data bit can be used to provide a corresponding system-level version bit for selecting rules based on their corresponding version bits. The make-before-break processing goes essentially as follows:
1. Suppose the current version of the rules (say, v0) currently being used in the TCAM have their version bits set to binary 0, and that the next version of rules (say, v1) have their version bits set to binary 1.
2. The v0 rules remain untouched in the TCAM, while the v1 rules are computed and downloaded to the TCAM. The system-level version bit can be set to binary 0 so that packets match the v0 rules while this is happening.
3. The system-level version bit is then atomically updated to v1. Packets then start matching the v1 rules at this stage.
4. The older version (v0 rules) are then deleted from the classifier stages. Packets continue to match the v1 rules during this update and going forward afterwards.

In other architectures, the system-level version bit can be atomically set via supporting hardware (e.g., a network processor), rather than being a property of the TCAM hardware itself. The system-level version bit is essentially an atomically updatable state (e.g., whether via a register in TCAM or in a supporting hardware component like a network processor using the TCAM) and thus can carried along with the packet fields as 'metadata.'

This approach assumes the availability of resources to store both v0 and v1 rules in the TCAM simultaneously. A straightforward approach is to sum up the resources needed for the v0 and v1 rules and ensure that there is room in the TCAM before indicating to the user that the update can be done hitlessly. TCAM resources are often highly utilized and the make-before-break approach can become an impediment to hitless upgrades when utilization in the TCAM becomes greater than 50%.

The present disclosure describes a process for hitless upgrade of TCAM rules (and more generally rules represented using ternary expressions) in a packet classifier to replace the old list of rules in the TCAM with a new list of rules in a way that reduces the storage requirements in the TCAM. In accordance with a specific illustrative embodiment, for example, the process can include creating a merged list of rules that contains rules unique to the old list, rules that constitute a "longest mergeable subsequence" (LMS) of rules, and rules that are unique to the new list. The LMS can refer to the longest subsequence of rules in the old list, where the rules in the LMS occur in the new list in the same the order but not necessarily contiguously. The LMS represents a maximum overlap of rules between the old list and the new list.

The LMS can reduce the storage requirements for a hitless upgrade by the number of rules in the LMS. Conventional hitless upgrades require storage for $N_{old}+N_{new}$ rules; the TCAM must be able to store the entirety of both lists. By comparison, hitless upgrade in accordance with the present disclosure can reduce that amount by $N_{LMS}$ rules, namely the storage requirement is for $(N_{old}+N_{new}-N_{LMS})$ rules, because the LMS contains both old and new rules; this overlap reduces the total number of rules that need to be stored in the TCAM.

In many scenarios it is likely that the old list and new list are very similar and thus would have many entries in common. Processing in accordance with embodiments of the present disclosure can advantageously reduce the storage requirements in order to provide hitless upgrades of rules in a packet classifier while at the same time reducing storage requirements in the TCAM.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 is a high level block diagram of network device 102 in network system 100 to communicate data between network 12 (e.g., physical network, virtualized network, etc.) and a number of devices 14. In some embodiments, network device 102 can be a switch, router, hub, bridge, gateway, and the like. More generally, network device 102 can be any kind of device that can provide access to network 12 to provide network connectivity to devices 14. In some embodiments, for example, network device 102 can communicate with network 12 via uplink 104 coupled between the network and uplink port 122 of the network device. Similarly, network device 102 can communicate with each device 14 via a respective downlink 106 coupled between the device and a respective downlink port 124 of the network device.

Generally, uplink port 122 and uplink 104 can be configured for a high-speed wired connection (e.g., copper, fiber, etc.) to provide increased throughput capability relative to downlink ports 124 and downlinks 106. The respective downlinks 106 between network device 102 and devices 14 can be any suitable connection, including wired connections and wireless connections.

In some embodiments, device 14 can be any type of device that can communicate network data with another device, such as a personal computer, laptop, or server. Device 14 can also be a mobile device (e.g., phone, smartphone, personal gaming device, etc.), or another network device. In some embodiment, devices 14 can be virtual machines or can be a host machine that hosts one or more virtual machines, and so on.

Network data can be communicated by network device 102 over uplink 104 and downlinks 106 using any suitable communication protocol; e.g., transmission control protocol (TCP), file transfer protocol (FTP), simple mail transfer protocol (SMTP), Ethernet, Telnet, etc. The network data being communicated by network device 102 can be a stream of network frames, datagrams or data packets, or other types of discretely switched network data. In some embodiments, for example, network device 102 can communicate network data between devices 14 and network 12 or between devices 14 using a variety of communicating techniques (e.g., layer 2 switching, layer 3 routing, etc.).

Network device 102 can include data plane 126 (also referred to as a forwarding plane) to receive, process, and forward network data to the next hop according to various configuration data such as forwarding information, security data, quality of service (QOS) levels, and the like. Network device 102 can include control plane 128 to make decisions about where network traffic (i.e., network data) is sent.

Data plane 126 and control plane 128 can include respective packet processing rules 126a, 128a comprised of classifiers and corresponding actions (not shown). Packet processing rules may be referred to herein as "packet routing rules," "rules," and the like. Changes in network topology, network policy, and the like typically require corresponding changes in packet processing rules 126a and/or 128a. In accordance with some embodiments of the present disclosure, replacement rules 16 can be processed by rules updater 130 to replace an older version (set) of rules 18 that are currently installed in network device 102 (e.g., in data plane 126 and/or control plane 128). This aspect of the present disclosure is discussed in more detail below.

Figure 2:
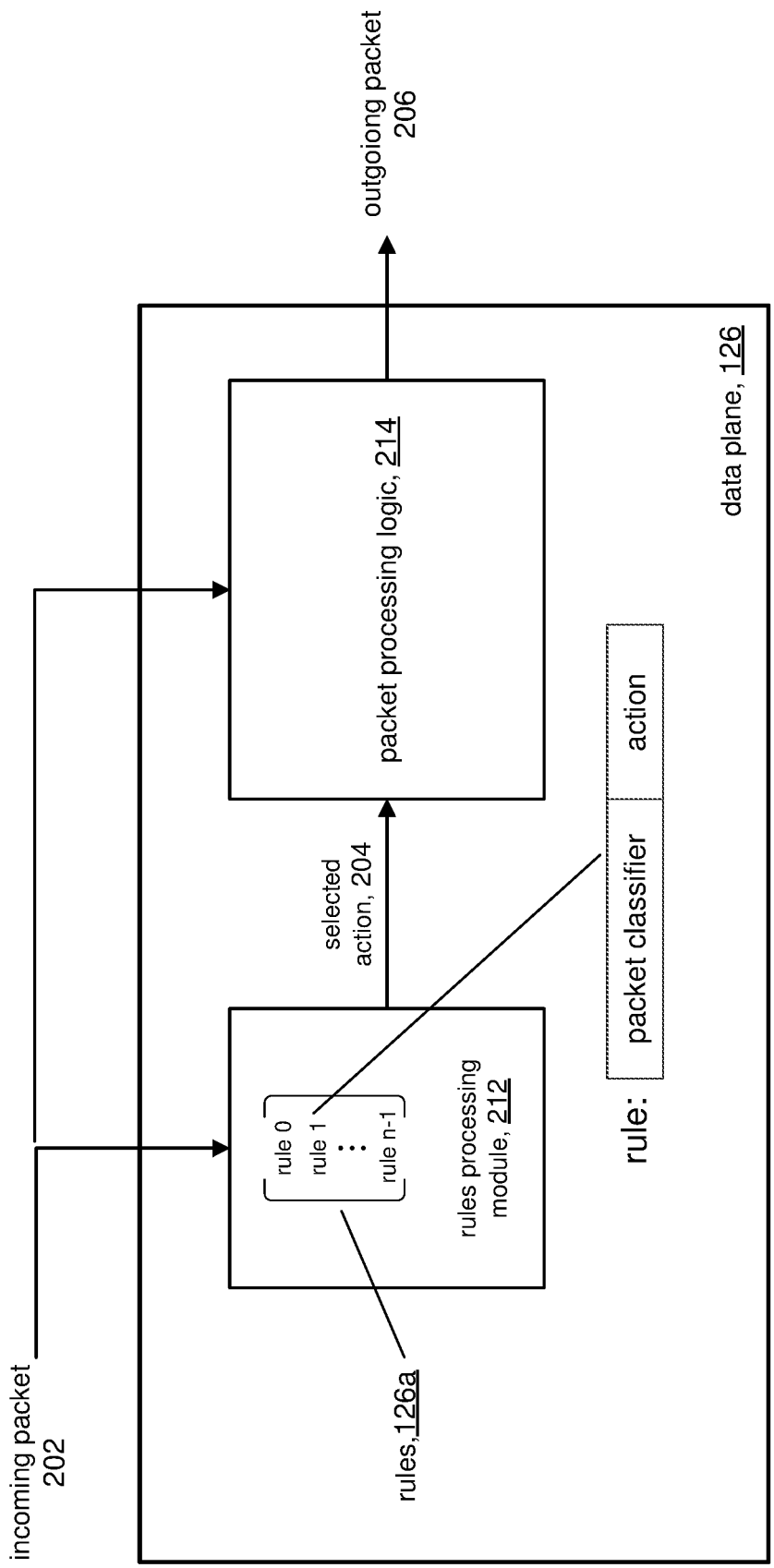
FIG. 2 illustrates details of a data plane in accordance with some embodiments.

Turning to FIG. 2, a brief overview of the flow of network data in network device 102 will be described. Merely to illustrate the description, the flow of network data in data plane 126 shown in FIG. 1 will serve as an example. Data plane 126 can include rules processing module 212 and packet processing logic 214. An incoming packet 202 can be initially processed by rules processing module 212 to determine a suitable action to be performed on the incoming packet. Rules processing module 212 can include a list of packet processing rules 126a (hereinafter, "rules") to facilitate identifying a suitable action. Rules processing module 212 can produce selected action 204, which can then be provided to packet processing logic 214. Selected action 204 can direct or otherwise influence the processing of incoming packet 202 by packet processing logic 214 to produce outgoing packet 206.

Figure 3:
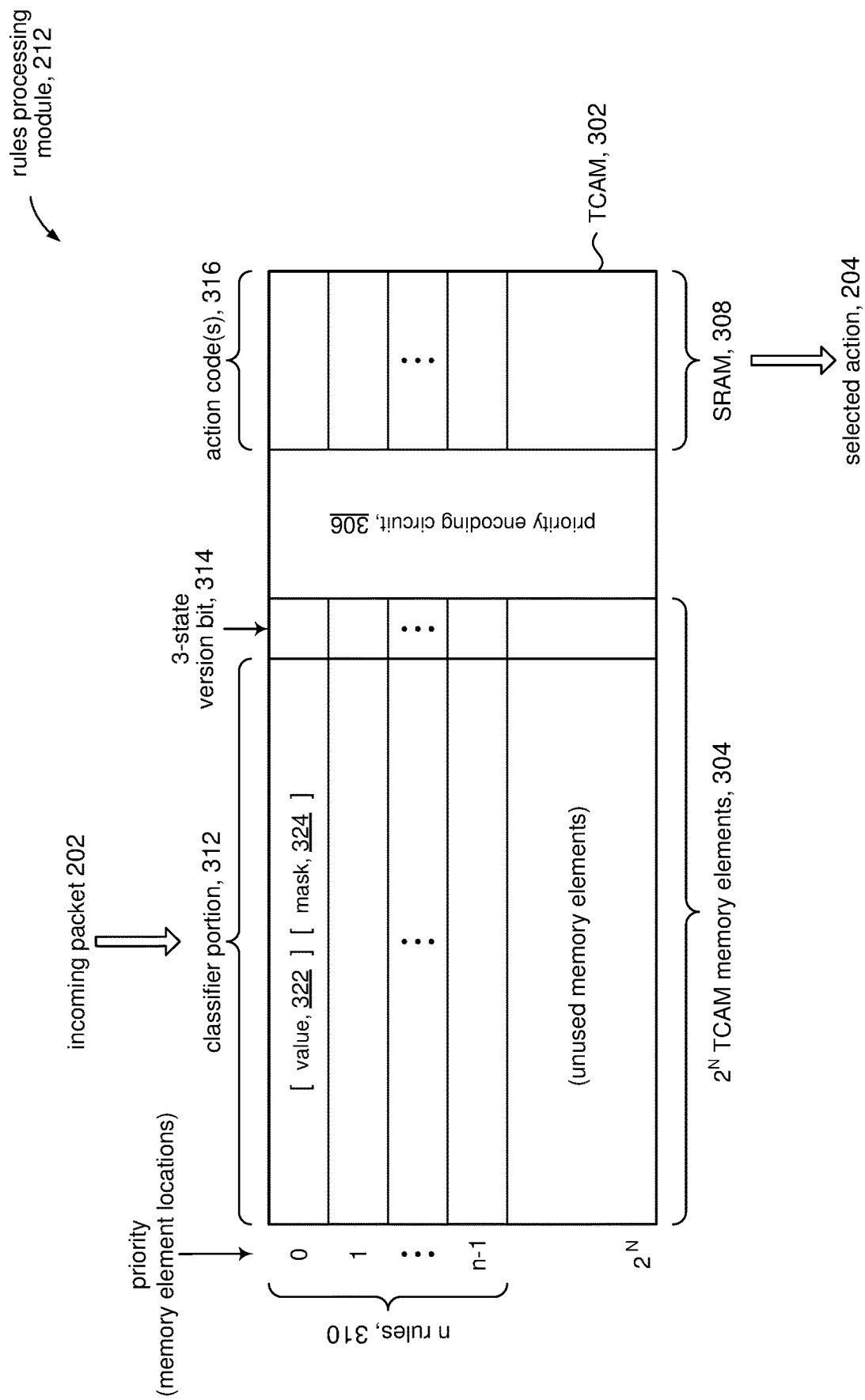
FIG. 3 illustrates details for a rules processing module, such as shown in FIG. 2, in accordance with some embodiments.

Rules 126a stored in rules processing module 212 can be prioritized. As depicted in FIG. 2, for example, rule O can be deemed to be higher in priority than rule 1, rule 1 can be deemed to be higher in priority than rule 2, and so on. Each rule (e.g., rule 1) comprises a packet classifier portion and an action portion (FIG. 3). When rules processing module 212 receives incoming packet 202, the incoming packet can be matched against the packet classifier portions of each rule. In the case that incoming packet 202 matches multiple rules, the highest priority of the matched rules is selected. Rule processing module 212 will process incoming packet 202 against the matched rule, and output its associated action portion, as selected action 204.

In some embodiments, rules 126a can be stored in a ternary content-addressable memory (TCAM). A TCAM is a type of content-addressable memory (CAM), also known as "associative storage." CAMs compare the desired information against all prestored entries simultaneously. CAMs can employ non-volatile memory (e.g., static RAM (SRAM)) with additional circuitry that enables search operations to complete in a single cycle. CAMs provide fast table lookups, and are often found in network routers and switches. While a CAM stores bits in one of two data states (binary 0 and binary 1), a TCAM can store a data bit in a third data state referred to as the "don't care" ('X') state, where the data bit acts as a wildcard and will match either a binary 0 or a binary 1. In accordance with some embodiments of the present disclosure, the rules can use this wildcard data state for their version bits.

It is noted that the rules need not be stored in a TCAM, which is generally more costly, consumes board space, and consumes more power. In some embodiments, for example, rules 126a can be stored in memory that is less costly than TCAMs such as, for instance, SRAMs. In some use cases, for example, speed of operation may not be so important as to merit the cost of a TCAM, and instead SRAMs can be employed along with a suitable search algorithm to provide the same rule searching functionality. The remaining disclosure will use TCAMs as examples for discussion purposes, without loss of generality and with the understanding that the present disclosure can be practiced in embodiments that do not use TCAMs.

FIG. 3 is a schematic representation of an embodiment of rules processing module 212 that is based on a TCAM 302. In some embodiments, for example, TCAM 302 can include a memory component comprising $2^N$ TCAM memory elements 304 that comprise 3-state memory cells and support circuitry (not shown) to enable simultaneous comparison of incoming packet 202 against every memory element 304 in the TCAM. Rule priority can be based on where in the rule is stored; e.g., the location of each memory element (0 . . . $2^N$) can correspond to the priority of a rule. In some embodiments, for example, the convention can be to store the highest priority rule in location 0, the next highest priority rule in location 1, and so on. It will be appreciated, however, that rule priority can be established in other ways.

TCAM 302 can include priority encoder circuit 306. When incoming packet 202 matches a rule in a memory element, that element can become "active." In the case of multiple matches, multiple memory elements can become active. Priority encoder circuit 306 can provide an N-bit output that represents the position of the highest priority active TCAM memory element to ensure that only one active memory element is identified. In some embodiments, each of the $2^N$ TCAM memory elements 304 can output a binary '0' signal or binary '1' signal to priority encoder circuit 306 depending on whether or not the memory element is active (e.g., matches incoming packet 202). Priority encoder circuit 306 can output an N-bit value that represents the highest priority memory element among the active memory elements.

TCAM 302 can include SRAM 308. Each TCAM memory element 304 has a corresponding memory location in SRAM 308. The N-bit output of priority encoder circuit 306 can be used to access the memory location in SRAM 308 that corresponds to the highest priority active TCAM memory element identified by the priority encoder circuit.

As shown in FIG. 3, in some embodiments, each packet processing rule 310 can comprise packet classifier portion 312 and action code(s) 316. Classifier portion 312 can comprise one or more value/mask fields, with each field comprising value component 322 and mask component 324. Incoming packet 202 is "classified" by matching the value/mask field(s) in each rule 310 against corresponding fields in the incoming packet. Action code(s) 316 represents one or more actions to be taken when incoming packet 202 matches the corresponding rule. In some embodiments, the classifier portion of each rule 310 can be stored in the TCAM memory elements of TCAM 302 and the associated action code component can be stored in a memory location in SRAM 308 that corresponds to the rule's location in the TCAM.

In some embodiments, each rule 310 can include 3-state version bit 314. The version bits can be used to identify whether the rule is an old rule or a replacement rule. For example, rules 310 already installed in TCAM 302 ("old rules") have their version bits 314 set to a first data state (e.g., data state '0'). Logic (not shown) in rules processing module 212 can then be controlled or signaled to process incoming packets with rules whose version bits are set to the first data state.

The use of version bits allows for replacement rules to be downloaded and stored in the TCAM without interfering with the old rules. Rules in a replacement list ("replacement rules"), for example, would have their version bits set to a second data state different from the first data state (e.g., data state '1') so that the logic in rules processing module 212 can distinguish between the already installed old rules and the replacement rules. When the replacement rules are ready to be activated to do packet matching, the logic in the rules processing module 212 can be controlled to use rules with version bits set to the second data state to process incoming packets with. When another set of replacement rules needs to be downloaded, the version bits in those rules can be set to the first data state to distinguish from the newly activated rules that have their version bits set to the second data state. In this way, the version bits can toggle between the first and second data states with each successive set of replacement rules. In accordance with the present disclosure, the version bits can be set to the "don't care" (wildcard) data state 'X' during the update process when a set of replacement rules is downloaded to the TCAM 302. This aspect of the present disclosure is discussed in more detail below.

Figure 4:
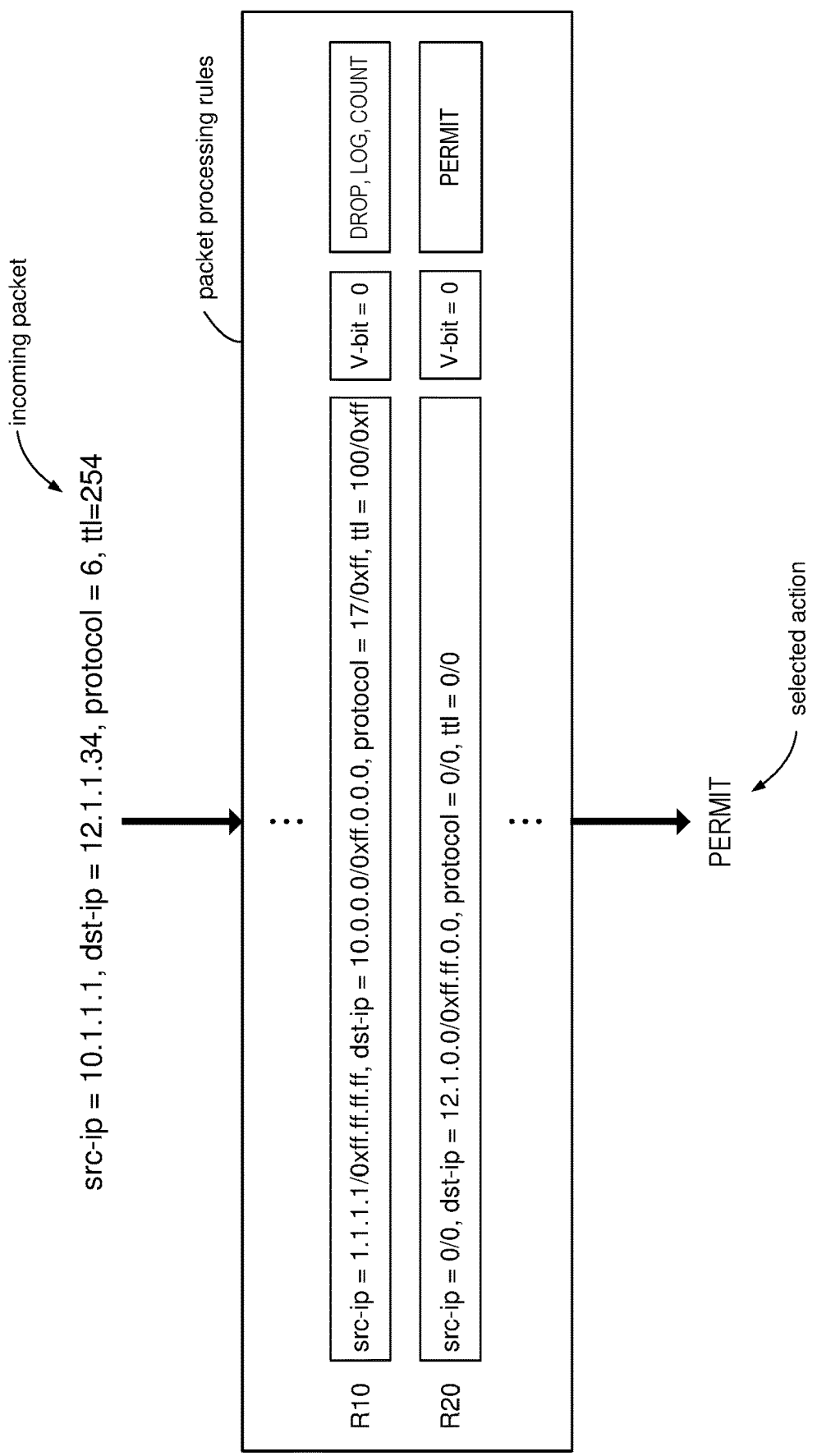
FIG. 4 illustrates examples of packet processing rules.

FIG. 4 provides some specific examples of rules. FIG. 4 shows a set of packet processing rules (e.g., stored in a TCAM) that includes rules R10 and R20. The classifier portion of rule R10 comprises four fields which are expressed as value/mask pairs: a first field (src-ip=1.1.1.1/ 0xff.ff.ff.ff) specifies a value component 1.1.1.1 and a mask component 0xff.ff.ff.ff to match against the source IP portion in an incoming packet; a second field (dst-ip=10.0.0.0/ 0xff.0.0.0) specifies a value of 10.0.0.0 and a mask 0xff.0.0.0 to match against the destination IP portion in the incoming packet; a third field (protocol=17/0xff) is used to match against the protocol specified in the incoming packet; and a fourth field (ttl=100/0xff) is used to match against the incoming packet's time-to-live value. In addition, rule R10 is associated with three actions: DROP, LOG, and COUNT so that an incoming packet that matches the classifier portion of rule R10 will be processed according the three actions. Likewise, the classifier portion of rule R20 comprises four value/mask fields: src-ip=0/0, dst-ip=12.1.0.0/0xff.ff.0.0, protocol=0/0, and ttl=0/0, and is associated with one action, namely PERMIT. The examples depicted in FIG. 4 show that the number of value/mask fields in a rule can vary from one rule to another, as well the kind of data (IP, ttl, etc.) that is matched. The number of actions can vary from one rule to another.

To complete the discussion, the incoming packet shown in FIG. 4 will match rule R20, and so the selected action that would be produced by a rules processing module (e.g., 212) will be the PERMIT action associated with rule R20.

Figure 5A:
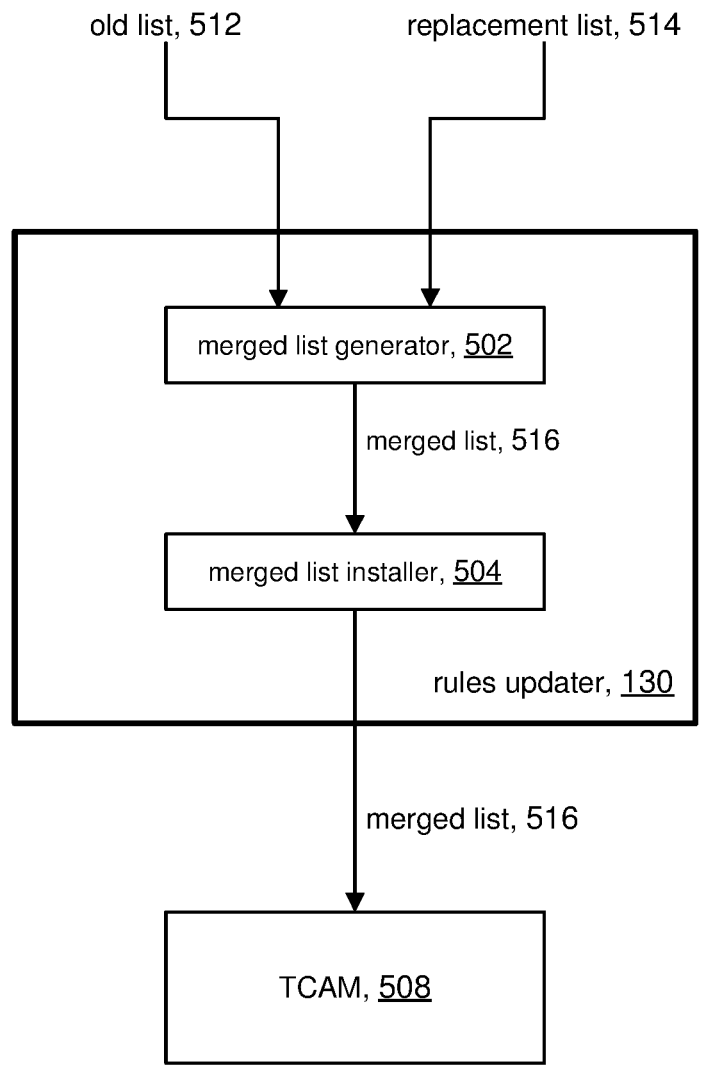
FIG. 5A illustrates details for a rules updater, such as shown in FIG. 1, in accordance with some embodiments.

FIG. 5A illustrates details of rules updater 130 shown in FIG. 1 in accordance with the present disclosure. The function of rules updater 130 is to update or otherwise upgrade packet processing rules in network device 102 by replacing a set of rules already installed or otherwise downloaded to the network device (old rules 512) with a set of replacement rules 514. In some embodiments of the present disclosure, rules updater 130 can include merged list generator 502 to generate merged list 516 from old rules 512 and replacement rules 514. Merged list installer 504 can install or otherwise download merged list 516 into a TCAM 508 in accordance with the present disclosure to effect replacement of the old list of rules with the replacement list of rules.

Figure 5B:
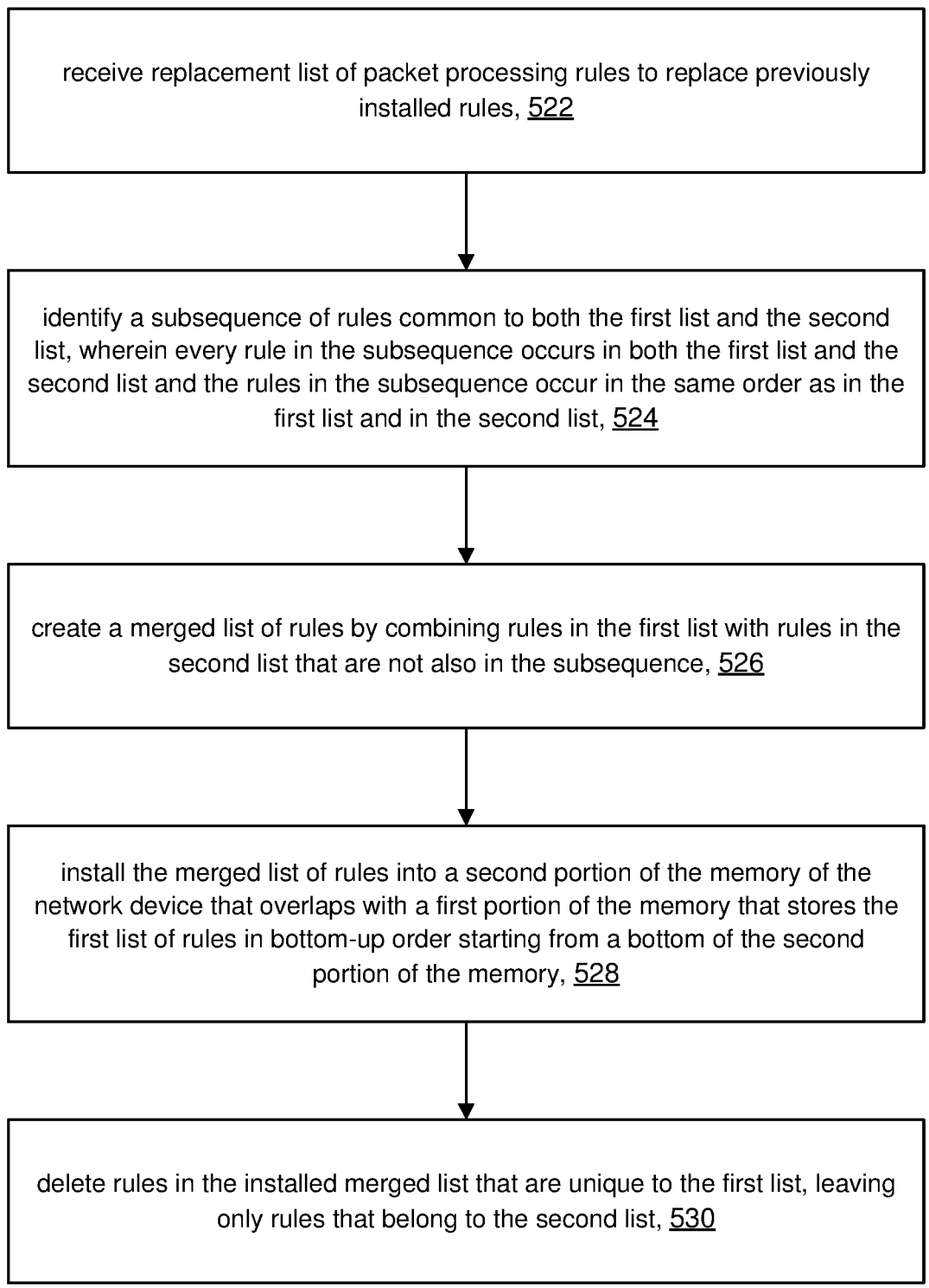
FIG. 5B illustrates an example of the flow of operations of the rules updater in accordance with some embodiments.

Referring to FIG. 5B, the discussion will now turn to a high level description of processing in network device 102 (e.g., by rules updater 130 in accordance with the present disclosure. In some embodiments, for example, network device 102 can include computer executable program code, which when executed by a processor (e.g., 1502, FIG. 15), can cause the network device to perform processing in accordance with FIG. 5B. The flow of operations performed by the network device is not necessarily limited to the order of operations shown. These operations are discussed in more detail below.

At operation 522, network device 102 can receive as inputs a first list of packet processing rules (e.g., old rules list 512) and a second list of packet processing rules (e.g., replacement rules list 514). For example, old list 512 can be the set of rules that have been previously installed in or otherwise downloaded to network device 102. In some embodiments, for example, old list 512 can be provided to merged list generator 502 directly from within network device 102. In other embodiments, old list 512 can be provided to rules updater 130 from a source external to network device 102; e.g., by a system administrator. Replacement list 514 can refer to a new set of rules to replace the old set of rules. Replacement list 514 can include one or more rules from the old list and one or more new rules. For instance, a system administrator may make several modifications to the old rules which can be then downloaded to TCAM 508 as replacement rules. In other instances, modification of the old rules may be internally triggered by a network event and the like.

At operation 524, network device 102 can identify a subsequence of rules common to both the first list and the second list (e.g., FIG. 8A), wherein every rule in the subsequence occurs in both the first list and the second list and the rules in the subsequence occur in the same order as in the first list and in the second list.

At operation 526, network device 102 can create a merged list of rules (e.g., FIG. 10) by combining rules in the first list with rules in the second list that are not also in the subsequence.

At operation 528, network device 102 can install or otherwise download the merged list of rules into a second portion of the memory (e.g., TCAM) of the network device to effect replacement of the old list of rules with the replacement list of rules. In some embodiments, the second portion of memory can overlap with a first portion of the memory that stores the first list of rules in bottom-up order starting from a bottom of the second portion of the memory. See, for example, times T4, T5, T6 in FIG. 13.

At operation 530, network device 102 can delete rules in the installed merged list that are unique to the first list, leaving only rules that belong to the second list. See, for example, times T2, T3 in FIG. 14.

Figure 6:
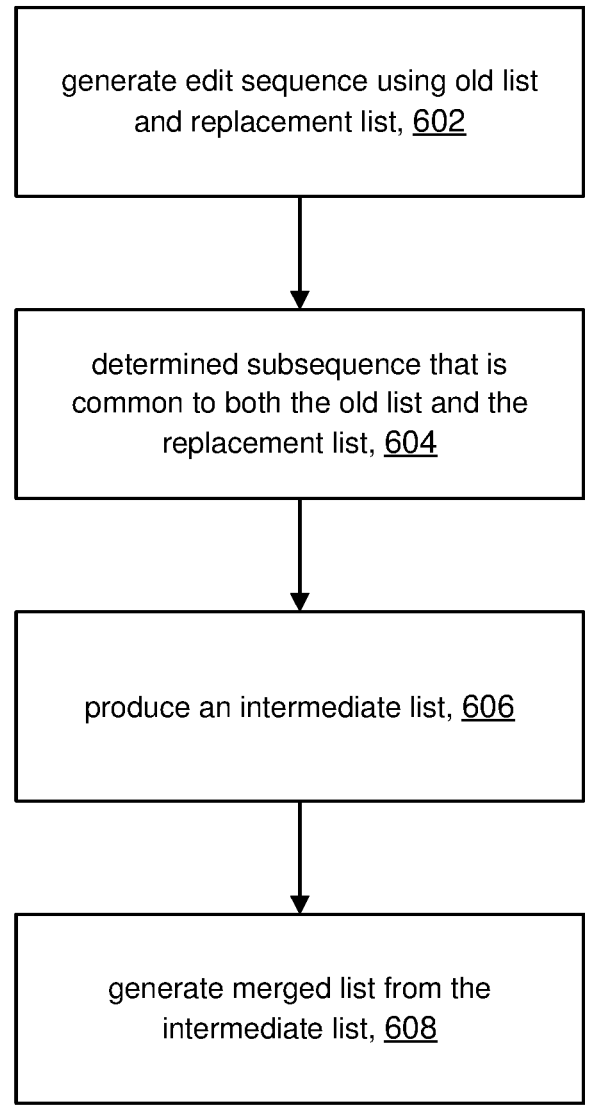
FIG. 6 illustrates an example of processing to generate a merged list in accordance with the present disclosure.

Referring to FIG. 6, the discussion will now turn to a high level description of processing in network device 102 (e.g., by merged list generator 502 in rules updater 130, FIG. 5A) to produce a merged list in accordance with the present disclosure. In some embodiments, for example, network device 102 can include computer executable program code, which when executed by a processor (e.g., 1502, FIG. 15), can cause the network device to perform processing in accordance with FIG. 6. The flow of operations performed by the network device is not necessarily limited to the order of operations shown. Illustrative details for the operations shown in FIG. 6 are provided with examples in FIGS. 7A, 7B, 7C, 8A, 8B, 9A, 9B, 9C, and 10.

Operation 602 (FIG. 6)

At operation 602, network device 102 can generate an edit sequence from an old (first) list of rules and a replacement (second) list of rules. In accordance with the present disclosure and for reasons that will be explained below, each rule can be viewed or represented by a symbol, and the set of rules in a list can be represented as a string of symbols. Referring to FIG. 7A for example, let string 702 represent an old list of rules that is already installed in network device 102. The order of symbols in string 702 can indicate the order of priority of the rules, and a convention can be adopted whereby the symbol at the beginning of the string represents the highest priority rule with subsequent symbols in the string representing successively lower priority rules. For example, the rule represented by symbol 'A' in string 702 represents the highest priority rule in the old list, whereas the lowest priority rule is represented by symbol 'G'.

Let string 704 represent a replacement list of rules that are to be installed in network device 102, in place of the old list. The replacement rules may include rules from the old list, rules from the old list appearing in different order, new rules not found in the old list, and so on. The example shown in FIG. 7A, for instance, shows that the replacement rules include rules that are the same as in the old list, namely rules A, B, C, E, F and rules that are different (new) from the old list, namely L, M, N, O.

Two rules can be deemed "different" if they match different packets. Moreover, even if two rules match the same packet, they can be deemed different if they match perform different actions (operations). An example is shown in FIG. 7B with rules X and Y. The two rules are identical except for the action portion—rule X is associated with action PERMIT and rule Y is associated with action DROP; rules X and Y can be deemed to be different from each other.

Recall from the discussion of version bits in FIG. 3 that in some embodiments a rule can include a version bit that is set to one data state (e.g., data state '0') to indicate that it is an old rule and the version bit that can be set to another data state (e.g., data state '1') to indicate it is a replacement rule. The version bit, therefore, does not affect which packets are matched or the action performed when the same packet is matched, just whether the rule participates in the packet matching process. Thus, although the rules A, B, C, E, F that appear in string 704 (replacement list) are intended to be the same rules in string 702 (old list), they will differ in the data states of their version bits; e.g., rule A in string 704 will have a different version bit setting than rule A in string 702. This is more clearly illustrated, for example, in FIG. 7B with rules X and Z. The two rules are identical except for the version bit (V-bit); rule X has its version bit set to '0' and rule Z has its version bit set to '1'. In accordance with the present disclosure, the version bits can be ignored when making a determination whether two rules are identical. Rules X and Z in FIG. 7B, for example, can therefore be deemed to be identical.

In accordance with the present disclosure, by treating the old rules and replacement rules as strings of symbols, it can be appreciated that an edit sequence can be generated that lists a set of changes (edits) to the old list of rules (represented by string 702) to transform the old list into the replacement list (represented by string 704). In some embodiments in accordance with the present disclosure, for example, a difference algorithm that generates an edit sequence can be based on conventional text comparison algorithms to compare the old and replacement rules by treating them as strings 702, 704. Text comparison algorithms are known, and a commonly known algorithm is disclosed in the publication entitled "An O(ND) Difference Algorithm and Its Variations," by Eugene W. Meyers in Algorithmica, November 1986, Volume 1, Issue 1-4, pp 251-266, which is incorporated herein by reference in its entirety for all purposes. This algorithm is used in the Linux™ operating system (OS) and other UNIX™ based OS's. It will be understood, however, that any suitable text comparison algorithm can be adapted for use with the present disclosure. For example, the comparison logic in a text comparison algorithm that checks the equality of two characters can be replaced with logic that checks the equality of two rules.

FIG. 7C shows an illustrative edit sequence 706 that can be generated from strings 702, 704 in accordance with some embodiments, where operations comprising the edit sequence can be applied to the old rules in string 702, as an input string, to produce, as an output string, the replacement rules in string 704. In some embodiments, the notation used in edit sequence 706 can be defined as follows:

x DEL—delete symbol x in the input string
x INS "$s_1$ $s_2$ $s_3$, . . ."—insert the sequence of symbols "$s_1$ $s_2$ $s_3$ . . ." immediately after symbol x in the input string
where—"symbol x" referred to in each operation always refers to the symbol position in the original input string before any of the operations are performed.

The figure illustrates the sequence of edit operations (by edit #) applied to string 702, showing intermediate results after each edit operation and the output string, namely string 704.

In some embodiments, the application programming interface (API) for the difference algorithm can have the form:

edit-sequence←diff (List1, List2,*compareRules)
where List1 and List2 can be pointers, respectively, to a list of old rules and a list of replacement rules,
compareRules is a pointer to a function compareRules (Rule1, Rule2) that represents comparison logic for comparing Rule1 with Rule2. The function returns YES if the two rules match and NO otherwise, and
edit-sequence references (e.g., is a pointer to) the set edit operations (e.g., edit sequence 706) to transform the List1 rules to List2 rules.

In some embodiments, the compareRules(Rule1, Rule2) function can ignore certain fields in the rules for comparison purposes. As explained above, for example, version bits in the rules can be ignored for comparison purposes. Accordingly, given two rules Rule1, Rule2 that are identical except for a difference in their version bits, the compareRules (Rule1, Rule2) function can ignore the data state of the version bits and deem to rules to be identical.

Operation 604 (FIG. 6)

At operation 604, network device 102 can determine a subsequence of rules that is common to both the old list of rules and the replacement list of rules. A subsequence of a given string can be defined as any sequence of symbols obtained by deleting zero or more symbols from the given string, without changing the sequence (order) of the symbols. Referring for a moment to FIG. 7A, a subsequence of string 702 can be the entire string, which is obtained by deleting zero symbols from string 702. Another subsequence of string 702 is "A B C D," obtained by deleting the symbols "E F G." A subsequence of a string can be non-contiguous. For example, the string "A B E G" is a subsequence of string 702 because it can be obtained by deleting the appropriate symbols. In each case, the sequence of the symbols as they appear in string 702 is unaffected. The string "A F B D E" would not be subsequence because symbol F is in the wrong sequence.

Figure 8A:
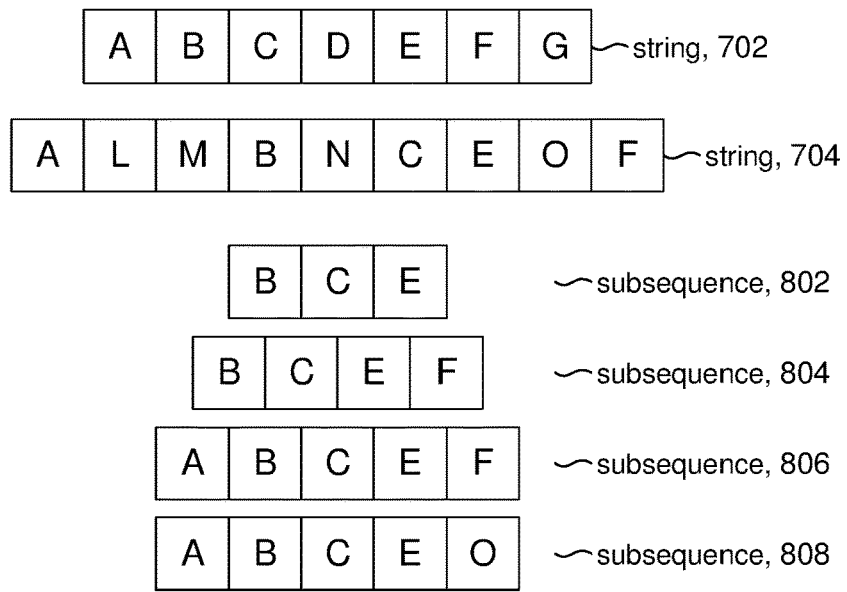
FIGS. 8A, 8B show examples of subsequences in connection with the processing described in FIG. 6.

A common subsequence can be defined as a subsequence that is common to two (or more) strings. FIG. 8A illustrate some examples of common subsequences using strings 702, 704 from FIG. 7A. For instance, subsequence 802 is a common subsequence; the symbols B C E appear in the same sequence (order) in both string 702 and string 704 even though the symbols B C E are not contiguous in either string 702 or string 704. Likewise with subsequence 804, the symbols B C E F appear in the same sequence, although not necessarily contiguously, in both strings 702, 704. Subsequence 806 constitutes the longest common subsequence between strings 702 and string 704. Subsequence 808 is an example of a subsequence in string 704, but is not a common subsequence between string 702 and string 704 because the symbol 'O' does not occur in string 702.

Figure 8B:
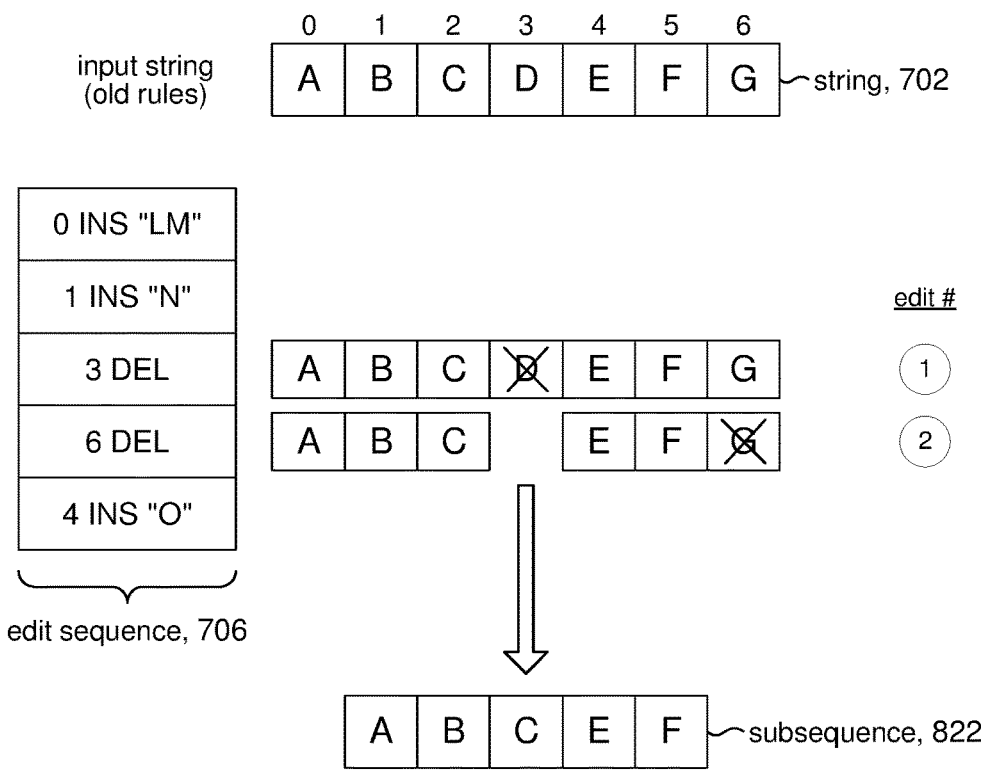

In some embodiments, a common subsequence between string 702 and string 704 can be generated by applying edit sequence 706 to the string 702, and in particular by applying only the delete operations in the edit sequence. With reference to FIG. 7C, for example, edit sequence 706 is generated by taking a difference between (input) string 702 and (output) string 704. A common subsequence between strings 702, 704 can be generated by applying the delete operations in edit sequence 706 to (input) string 702. FIG. 8B illustrates the sequence of operations (by edit #) with intermediate results, resulting in common subsequence 822 that represents a subsequence of rules found in both the old list (represented by string 702) and the replacement list (represented by string 704) in the same sequence (order), although not necessarily contiguously. Common subsequence 822 may also be referred to as the longest mergeable subsequence (LMS).

Operation 606 (FIG. 6)

Figure 9A:
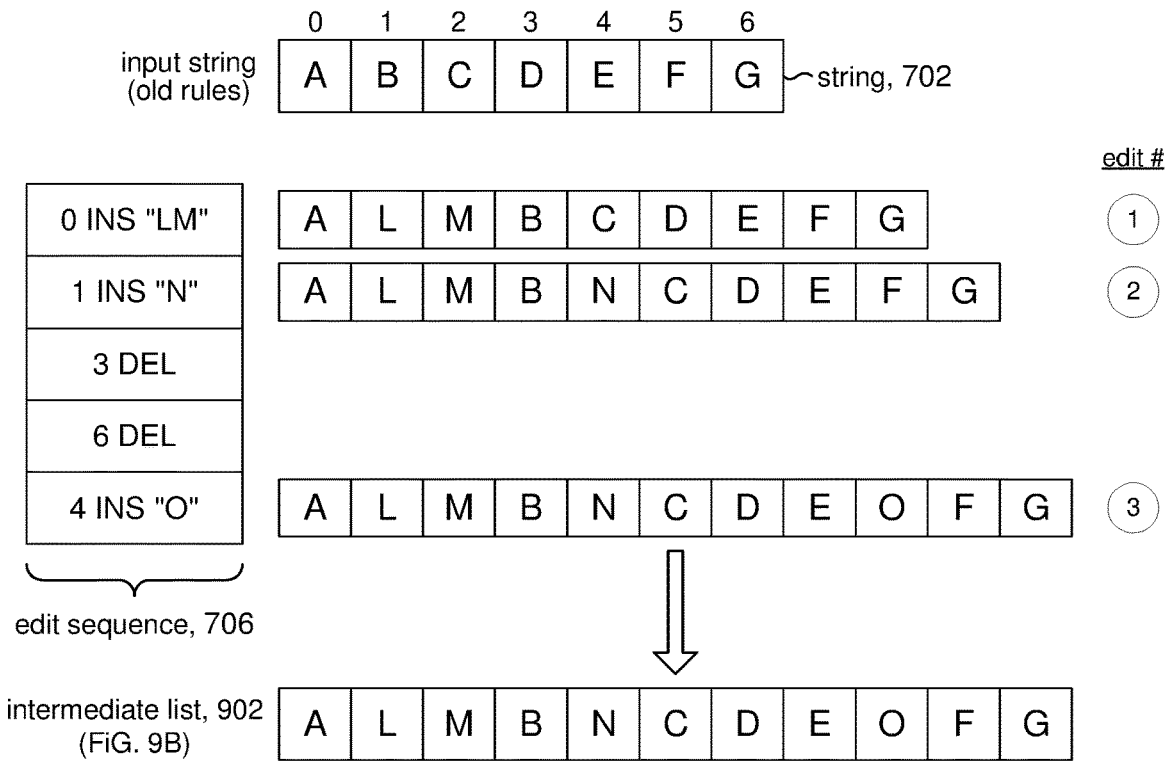
FIGS. 9A, 9B, 9C show an example of an intermediate list in connection with the processing described in FIG. 6.
Figure 9B:
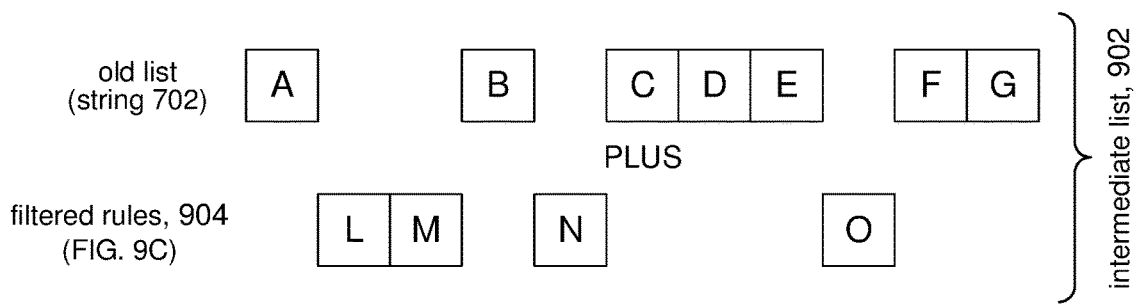
Figure 9C:
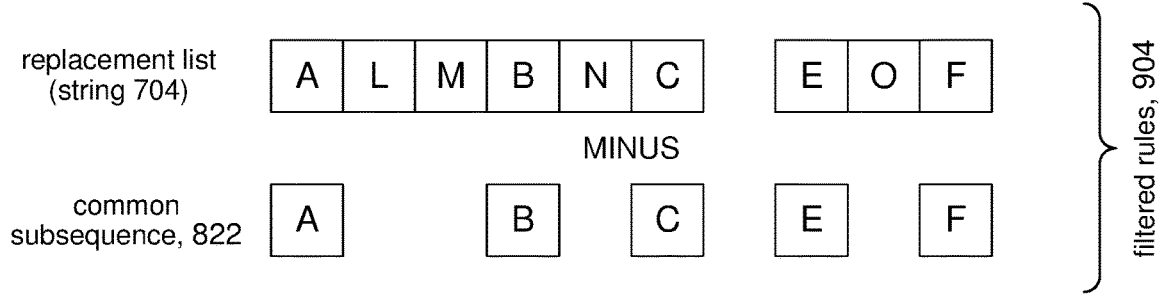

At operation 606, network device 102 can generate an intermediate list of rules that comprises rules from the old list (represented by string 702) and rules in the replacement list (represented by string 704) that are not also in common subsequence 822 (i.e., do not appear in the common subsequence). In some embodiments, for example, the intermediate list can be generated by applying edit sequence 706 to string 702, and in particular by applying only the insert operations in the edit sequence. Recall from FIG. 7C, edit sequence 706 can be generated by taking a difference between (input) string 702 and (output) string 704. An intermediate list can be generated by applying the insert operations in edit sequence 706 to (input) string 702. FIG. 9A illustrates the sequence of insert operations applied to string 702, resulting in intermediate list 902. The exploded view in FIG. 9B shows that intermediate list 902 comprises rules from the old list and a set of "filtered" rules 904. The exploded view in FIG. 9C, in turn, shows that filtered rules 904 comprise rules from the replacement list that are not also in common subsequence 822; in other words, rules from the replacement list with rules from the common subsequence removed (filtered out).

Operation 608 (FIG. 6)

At operation 608, network device 102 can generate a merged list of rules from the intermediate list of rules generated in operation 606. Recall that, in accordance with some embodiments, the version bits in the rules can be stored in a TCAM that supports three data states: '0', '1', and 'X' (don't care, wildcard). In some embodiments, the merged list can be generated from intermediate list 902 by setting the version bit of each rule in the intermediate list to an appropriate data state ('0', '1', 'X'), according to the following convention:

If a rule in the intermediate list appears only (is unique to) the old list of rules or only in the replacement list of rules, then do not change the data state of the version bit of that rule in the intermediate list. For example, rule D in the intermediate list appears only in the old list; therefore, the version bit of rule D in the intermediate list remains unchanged. Likewise, rule M in the intermediate list appears only in the replacement list; therefore, the version bit of rule M in the intermediate list remains unchanged. Accordingly, the version bits for rules (e.g. rules D, G, FIG. 7C) in the intermediate list that occur only in the old list will always be different from the version bits for rules in the intermediate list that occur only in the replacement list (e.g., rules L, M, N, O, FIG. 7C).

If a rule in the intermediate list appears in both in the old list and the replacement list, then set the version bit of the rule in the intermediate list to the don't care (wildcard) data state, 'X'. Stated differently, rules in common subsequence 822 have their version bits set to the don't care (wildcard) data state, 'X'.

Figure 10:
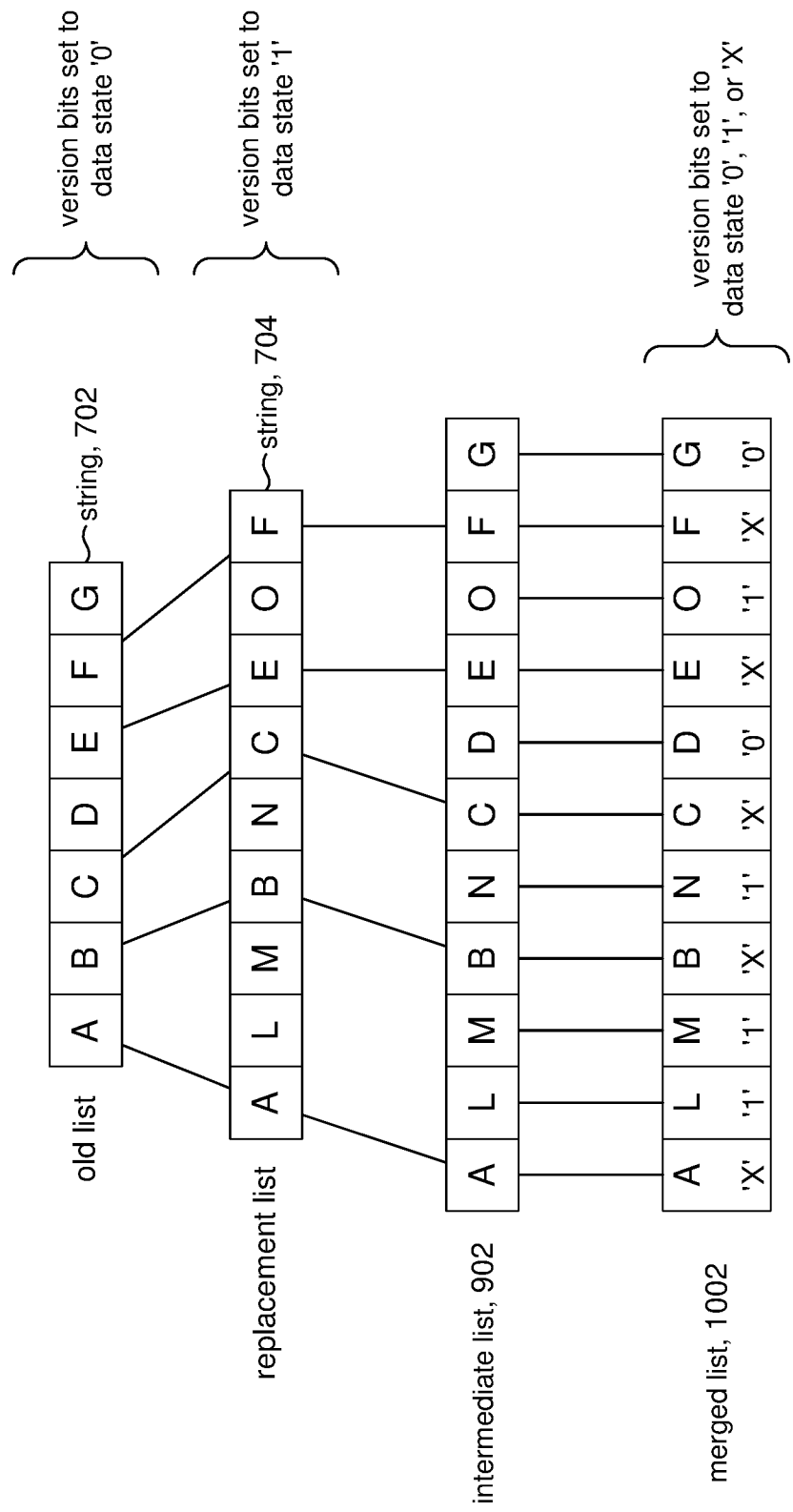
FIG. 10 shows an example of a merged list generated in accordance with the processing described in FIG. 6.

FIG. 10 illustrates an example using the old and replacement lists from FIG. 7A to format the intermediate list 902 from FIG. 9A to produce merged list 1002 in accordance with the above bit setting convention. In some embodiments, merged list 1002 comprises the same rules from intermediate list 902, but with their version bits in set to the data state as set forth above. It is noted that the rules in merged list 1002 marked with don't care ('X') appear only in common subsequence 822; and so in some embodiments the common subsequence itself can be used to identify the "don't care" rules. It can be seen that the merged list is smaller in size (11 rules) than the combination of the old list (7 rules) and the replacement list (9 rules). This aspect of the present disclosure is discussed further below. The resulting merged list 1002 can be deemed ready for downloading to the TCAM, which will now be described in connection with FIGS. 11, 12, 13, and 14.

Figure 11:
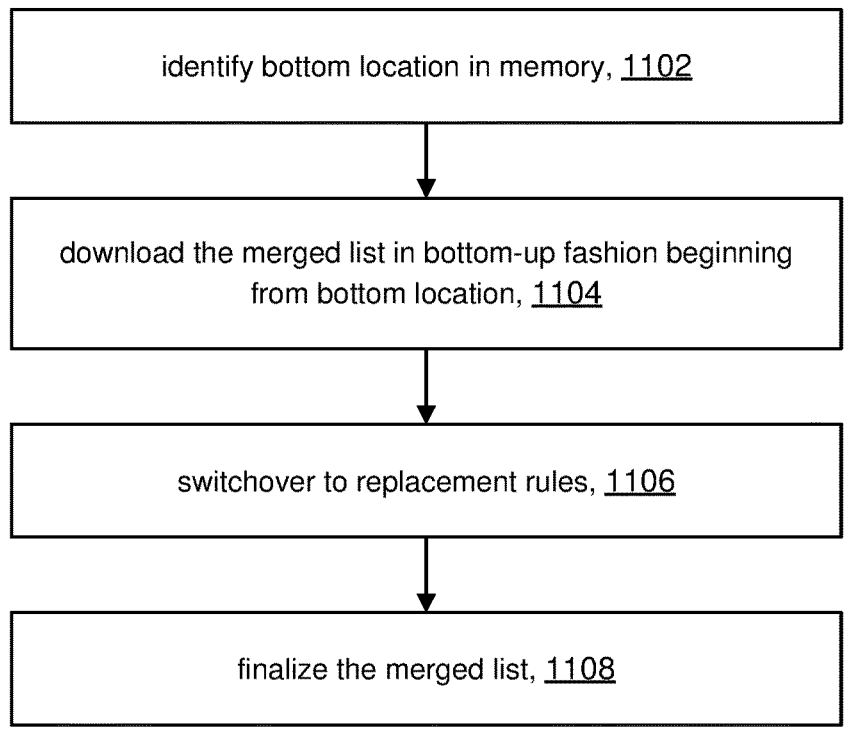
FIG. 11 illustrates an example of processing to install a merged list in a network device in accordance with the present disclosure.

Referring to FIG. 11, the discussion will now turn to a high level description of processing in network device 102 (e.g., by merged list installer 504 in rules updater 130, FIG. 5A) to download a merged list to a TCAM (e.g., 508) in accordance with the present disclosure. In some embodiments, for example, network device 102 can include computer executable program code, which when executed by a processor (e.g., 1502, FIG. 15), can cause the network device to perform processing in accordance with FIG. 11. The flow of operations performed by the network device is not necessarily limited to the order of operations shown. Illustrative details for the operations shown in FIG. 11 are provided with examples in FIGS. 12, 13, and 14.

Figure 12:
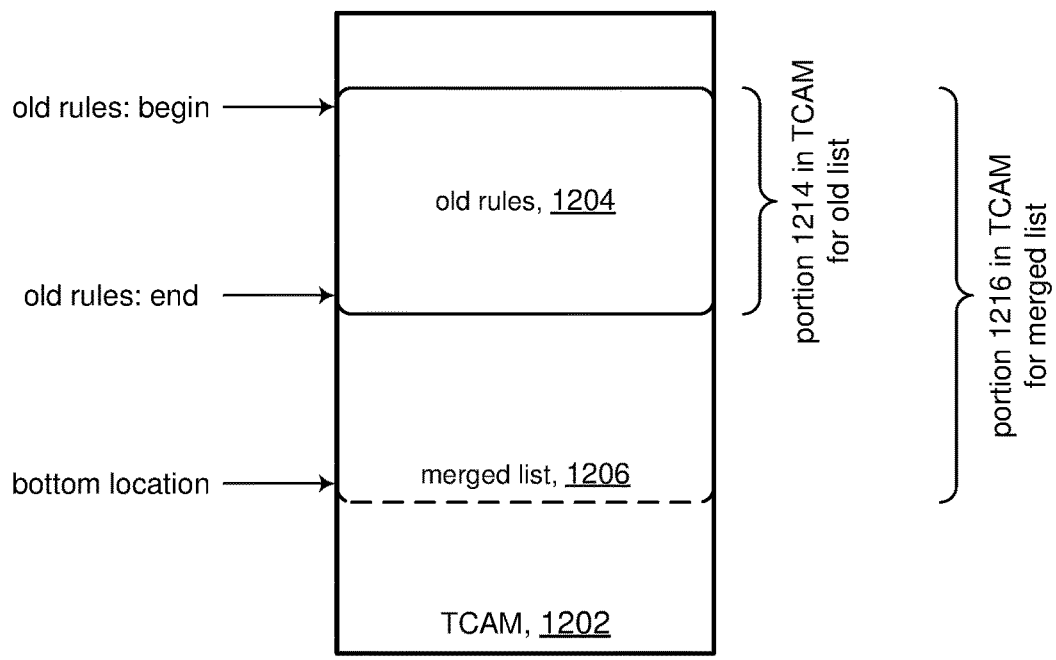
FIG. 12 shows an example of a ternary content-addressable memory (TCAM) in accordance with the processing described in FIG. 11.

At operation 1102, network device 102 can identify a bottom memory location in the TCAM as an initial step to set up for downloading merged list. In accordance with the present disclosure, the merged list of rules produced in operation 608 (FIG. 6) can overlay the previously downloaded old list of rules. In some embodiments, the bottom memory location in the TCAM can be computed based on the starting location in the TCAM of the old list and the number of rules in the merged list. Referring to FIG. 12, for example, old rules 1204 are shown stored in portion 1214 of TCAM 1202. The old rules may be stored starting at memory location 0 in the TCAM, but in general can start anywhere in the address space of the TCAM. In accordance with the present disclosure, merged list 1206 can be downloaded to TCAM 1202 by overlaying the old rules. A bottom memory location in the TCAM can be computed generally in accordance with the following to define portion 1216 in the TCAM, which overlaps portion 1214, to store the merged list:

bottom location=begin address of old list+memory size of merged list

Figure 13:
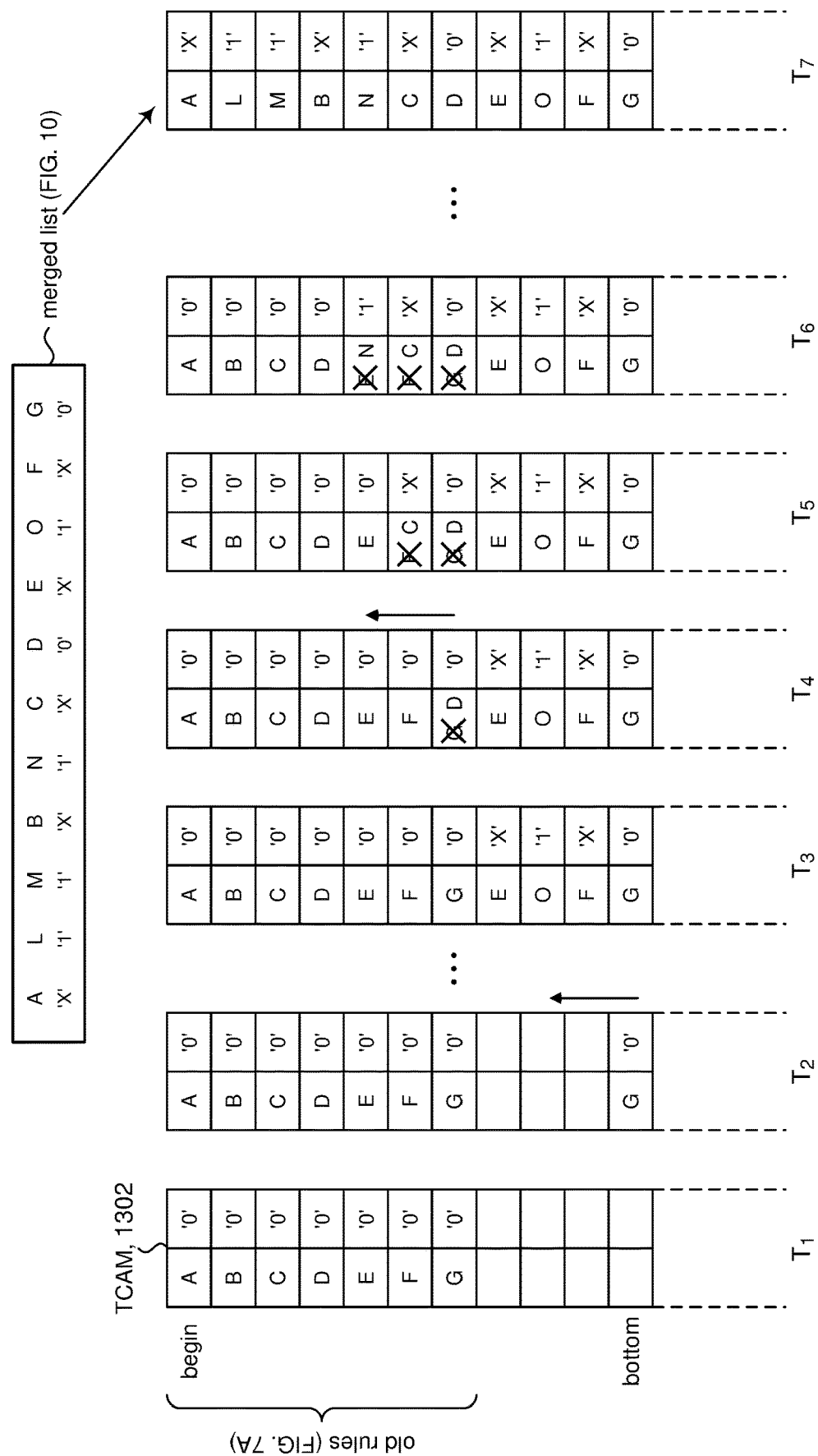
FIG. 13 shows an example of downloading a merged list into a TCAM in accordance with the processing described in FIG. 11.

At operation 1104, network device 102 can download (install) the merged list into the TCAM in bottom-up fashion, beginning from the bottom memory location determined at operation 1102. For example, the lowest priority rule in the merged list can be stored to the TCAM at the bottom memory location. The next lowest priority rule in the merged list can be stored in the next location up from the bottom memory location, and so on. The highest priority rule in the merged list would be the final rule to be stored in the TCAM. FIG. 13 shows an example of the fill sequence using the old list shown in FIG. 7A and the merged list shown in FIG. 10. At time T1, we see that TCAM 1302 contains only the old rules. The bottom memory location identifies where in TCAM 1302 the merged list will begin filling in from. At time T2, the lowest priority rule G in the merged list is loaded into the bottom memory location of TCAM 1302. This continues in bottom-up fashion as indicated by the arrow; at time T3, the four lowest priority rules from the merged list are stored in the TCAM. At time T4, the filling sequence begins to overwrite the old rules beginning from the lowest priority of the old rules. FIG. 13 illustrates a sequence of overwrites at times T4, T5, and T6, the old rules are successively overwritten in bottom-up fashion. At time T7, the entire merged list has been downloaded to the TCAM and the old rules have been overwritten; the merged list can be deemed to be downloaded. Operation of the TCAM during the download is discussed below.

At operation 1106, network device 102 can switchover to the replacement rules so that packet processing uses the replacement rules. In some embodiments, for example, logic in rules processing module 212 can then be controlled or signaled to match incoming packets with rules whose version bits are set to the data state corresponding to the replacement rules. Operation of the TCAM during at switchover is discussed below.

Figure 14:
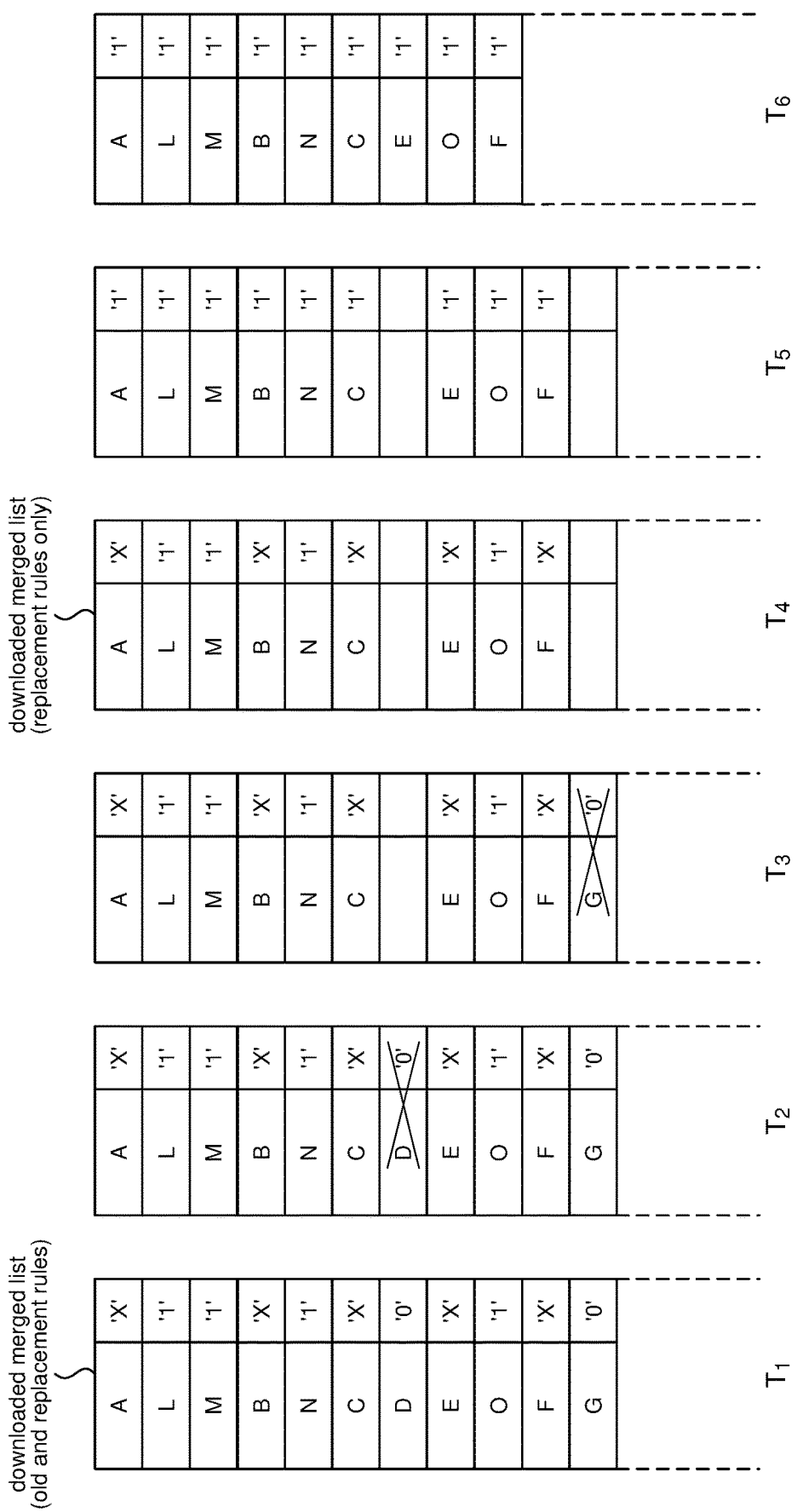
FIG. 14 shows an example of finalizing a downloaded merged list into a TCAM in accordance with the processing described in FIG. 11.

At operation 1108, network device 102 can finalize the downloaded merged list to complete the process of upgrading packet processing rules in a network device in accordance with the present disclosure. In some embodiments, the old rules can be deleted from the TCAM in top-down fashion, starting from the highest priority rule in the downloaded merged list. FIG. 14 shows an example of this sequence. Time T1 in FIG. 14 shows the downloaded rules (from time T7) in FIG. 13. At time T2, a top-down scan through the rules can begin from the highest priority rule (rule A) downward to search for a rule whose version bit has a data state that indicates an old rule, which in our running examples is data state '0'. At time T2, the first old rule is encountered at rule D. Rule D can be deleted, for example, by zeroing out entry(ies) in the TCAM associated with the rule. The downward scan continues, until at time T3 the next old rule is encountered at rule G and the rule is similarly deleted, and so on through the downloaded merged list. It is noted that with this deletion method, the order of deleting old rules need not occur in top-down order, and as can be seen the deletion order is not important.

At time T4, the TCAM contains only the replacement rules, albeit with some "holes" due to the deletion of the old rules. In addition, the version bits of the replacement rules are set to data state '1' or to data state 'X'. At time T5, another pass through the rules can be made to set all the version bits to data state '1'. This pass can be top-down or bottom-up.

At time T6, a compression operation can be performed to remove the holes (deleted old rules) in the TCAM in top-down fashion. When a hole is encountered, all rules below the hole up to the next hole can be moved up to fill the gap, one at a time in top to bottom order, thus ensuring ongoing packet processing remains unaffected (the operation is "hitless"). The finalization can be deemed complete, and upgrading the old rules with the replacement rules can be deemed complete. Operation of the TCAM during finalization is discussed below.

Figure 15:
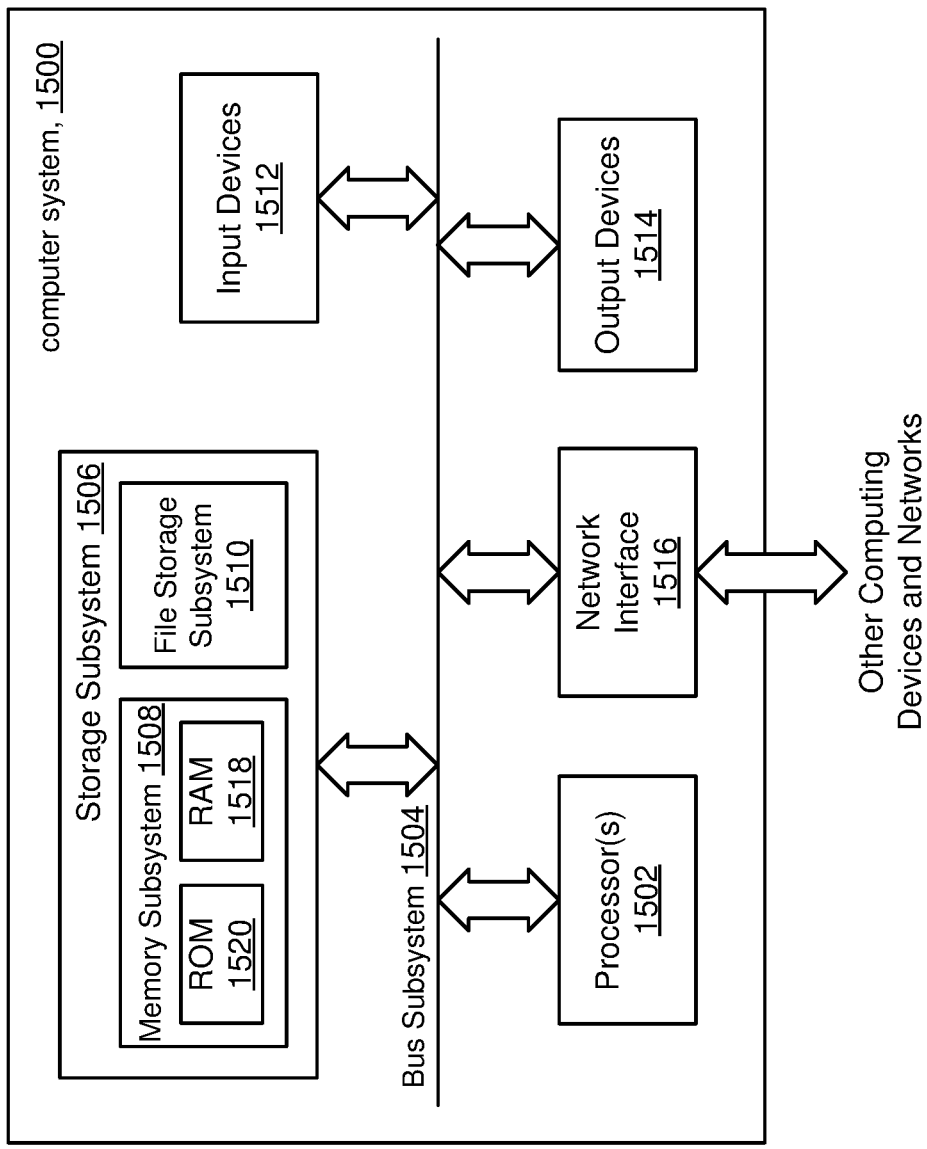
FIG. 15 shows a computer system that can be adapted in accordance with the present disclosure.

FIG. 15 depicts a simplified block diagram of an example computer system 1500 according to certain embodiments. Computer system 1500 can be used to embody rules updater 130 shown in FIG. 1, for example, via network device 102, data plane 126, control plane 128, and so on. As shown in FIG. 15, computer system 1500 includes one or more processors 1502 that communicate with a number of peripheral devices via bus subsystem 1504. These peripheral devices include storage subsystem 1506 (comprising memory subsystem 1508 and file storage subsystem 1510), user interface input devices 1512, user interface output devices 1514, and network interface subsystem 1516.

Bus subsystem 1504 can provide a mechanism for letting the various components and subsystems of computer system 1500 communicate with each other as intended. Although bus subsystem 1504 is shown schematically as a single bus, alternative embodiments of the bus subsystem can utilize multiple busses.

Network interface subsystem 1516 can serve as an interface for communicating data between computer system 1500 and other computer systems (e.g., device 14) or networks (e.g., network 12). Embodiments of network interface subsystem 1516 can include, e.g., an Ethernet card, a Wi-Fi and/or cellular adapter, a modem (telephone, satellite, cable, ISDN, etc.), digital subscriber line (DSL) units, and/or the like.

User interface input devices 1512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1500.

User interface output devices 1514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1500.

Memory subsystem 1506 includes memory subsystem 1508 and file/disk storage subsystem 1510 represent non-transitory computer-readable storage media that can store program code and/or data, which when executed by processor 1502, can cause processor 1502 to perform operations in accordance with embodiments of the present disclosure (e.g., FIGS. 6 and 11).

Memory subsystem 1508 includes a number of memories including main random access memory (RAM) 1518 for storage of instructions and data during program execution and read-only memory (ROM) 1520 in which fixed instructions are stored. File storage subsystem 1510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1500 is illustrative and many other configurations having more or fewer components than system 1500 are possible.

Packet Processing During Download (1104, FIG. 11)

As explained above and illustrated in FIG. 13, in accordance with the present disclosure replacement rules vis-à-vis the merged list can be downloaded in a region of the TCAM that overlaps with the old rules, thus overwriting the old rules; e.g., compare time T1 and time T7 in FIG. 13. Moreover, by writing the merged list to the TCAM in bottom up fashion, in accordance with the present disclosure, the old rules can continue to work while the merged list is being written despite that the old list of rules in the TCAM are being overwritten. This is made possible because the merged list includes the old list. Referring back to FIG. 13, for example, suppose the old rules are marked with their version bits set to data state '0' as shown in the figure; i.e., incoming packets are matched against rules with version bit '0'. Consider the situation at time T4. Rule G from the old list is overwritten by rule D from the merged list; however, rule G from the merged list has now been written to the bottom in TCAM. Suppose an incoming packet that matches with rule G comes in. The TCAM will still be able to match the incoming packet to rule G. Notably, the TCAM logic will not try to match rule O because its version bit is set to '1'. This is relevant because if the incoming packet can be matched by both rule O and rule G but have different actions, rule O would have priority over rule G resulting in an incorrect action for the incoming packet.

Consider the situation at time T7 in FIG. 13, where download of the merged list is complete and the old list is completely overwritten. However, it can be seen that the old list sill occurs in the downloaded merged list, and in the same order (i.e., rule priority is preserved). Moreover, rules from the replacement list are marked with version bit '1', so they will not be matched until switchover occurs. Rules in the old list are marked with either '0' or 'X' (don't care), and so the old rule will continue to be matched against incoming packets until switchover takes place. Thus processing in the TCAM can continue without delay (i.e., without taking a hit) despite overlaying the old rules with a merged list in accordance with the present disclosure.

Packet Processing at Switchover (1106, FIG. 11)

Referring to time T7 in FIG. 13, when the merged list has been download to the TCAM a switchover to the replacement rules can be made. It can be seen that the merged list includes the replacement rules (e.g., compare with string 704 in FIG. 10). Rules in the replacement list are marked with either '1' or 'X' (don't care). When switchover occurs, rules marked with '1' or 'X" will be matched against incoming packets. Thus processing in the TCAM can continue without delay (i.e., without taking a hit) with the replacement rules.

Packet Processing During Finalization (1108, FIG. 11)

It can be seen from FIG. 14 that the finalization process does not affect the priority of the replacement rules (marked by '1' and 'X'). At times T2 and T3, for example, old rules D and G are deleted, leaving only the replacement rules. Between times T4 and T5, rules marked with 'X' are set to '1', which does not affect the matching of incoming packets with the replacement rules. At time T6 holes created by deleting the old rules can be removed, again without impact to the matching of incoming packets with the replacement rules.

CONCLUSIONS

Embodiments in accordance with the present disclosure provide for hitless upgrade of packet matching rules in a network device to replace an already installed set of old rules with a set of replacement rules, while at the same time reducing the amount of memory (e.g., TCAM) needed to provide the hitless upgrade. For example, a conventional brute force approach to providing hitless upgrade is to simply download the entire set of replacement rules in an area of the TCAM that is not being used by the existing rules. When the download is complete, simply change the TCAM logic to match against the newly downloaded rules. This approach, however, requires $size_{old-rules}+size_{new-rules}$ amount of memory in the TCAM. This presents at least two challenges: (1) if the TCAM is highly utilized, there may not be sufficient space in the TCAM to download a new set of replacement rules; and (2) designing a network device with a larger TCAM just for the purpose of doing occasional upgrades can be costly in terms of material cost (TCAMs can be expensive) and power requirements (CAMs are generally power hungry devices). In a typical installation, the number of rules can be many 100s of rules.

By contrast, a merged list in accordance with the present disclosure can represent a maximum overlap between the old list of rules the replacement rules, while maintaining order of priority among the old rules and the replacement rules. Instead of having a size that is the sum of the old list and the replacement list, namely $size_{old-rules}+size_{new-rules}$, a merged list in accordance with the present disclosure has a size $size_{old-rules}+size_{new-rules}-size_{subsequence-list}$, where $size_{subsequence-list}$ is the size of a subsequence. Using the example shown in FIGS. 8A and 8B, the sizes of the old rules (string 704) and new rules (string 706) are 7 and 9, respectively. The size of the combination of the lists is therefore 7+9=16. The size of the subsequence (822) is 5. The size of the merged list is therefore 7+9−5=11, which can be verified by merged sequence 1002 in FIG. 10. In a situation where the replacement rules represent a small number of changes to the old rules, the size of the subsequence list can be quite large, indicating that there is a high degree of commonality between the old rules and the replacement rules and the resulting merged list that is downloaded to the TCAM can be much smaller than $size_{old-rules}+size_{new-rules}$.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
    receiving, by a network device, a second list of packet processing rules to replace a first list of packet processing rules previously installed in a memory of the network device;
    identifying, by the network device, a subsequence of rules common to both the first list and the second list, wherein every rule in the subsequence of rules occurs in both the first list and the second list and the rules in the subsequence of rules occur in the same order as in the first list and in the second list;
    creating, by the network device, a merged list of rules by combining rules in the first list with rules in the second list that are not also in the subsequence of rules; and
    installing, by the network device, the merged list of rules into the memory of the network device.

2. The method of claim 1, further comprising installing the merged list of rules into a second portion of the memory of the network device that overlaps with a first portion of the memory that stores the first list of rules.

3. The method of claim 2, further comprising installing the merged list of rules into the second portion of the memory of the network device in a bottom-up order starting from a bottom of the second portion of the memory.

4. The method of claim 1, further comprising deleting rules in the installed merged list that are unique to the first list, leaving only rules that belong to the second list.

5. The method of claim 4, wherein deleting rules in the installed merged list includes deleting rules that occur only in the first list in a top-down order.

6. The method of claim 1, wherein rules in the subsequence of rules do not necessarily occur contiguously in either or both the first list and the second list.

7. The method of claim 1, further comprising generating an edit sequence comprising INSERT and DELETE operations to transform the first list into the second list, wherein the subsequence of rules is based on the edit sequence.

8. The method of claim 7, further comprising using the DELETE operations in the edit sequence to identify the subsequence of rules in the first list.

9. The method of claim 1, wherein rules in the merged list that are unique to the first list are identified by a first indicator, rules in the merged list that are unique to the second list are identified by a second indicator, and rules in the merged list that are unique to the subsequence of rules are identified by a third indicator,
wherein installing the merged list includes matching incoming packets only with rules that are identified with the first and third indicators.

10. The method of claim 1, wherein the merged list of rules has a size smaller than a combined size of the first list and the second list.

11. The method of claim 1, wherein the memory of the network device is a ternary content addressable memory (TCAM).

12. A non-transitory computer-readable storage medium having stored thereon computer executable instructions, which when executed by a computer device, cause the computer device to:
receive a second list of packet processing rules to replace a first list of packet processing rules previously installed in a memory of a network device;
identify a subsequence of rules common to both the first list and the second list, wherein every rule in the subsequence of rules occurs in both the first list and the second list and the rules in the subsequence of rules occur in the same order as in the first list and in the second list;
create a merged list of rules by combining rules in the first list with rules in the second list that are not also in the subsequence of rules;
install the merged list of rules into a second portion of the memory of the network device that overlaps with a first portion of the memory that stores the first list of rules in a bottom-up order starting from a bottom of the second portion of the memory; and
delete rules in the installed merged list that are unique to the first list, leaving only rules that belong to the second list.

13. The non-transitory computer-readable storage medium of claim 12,
wherein the computer executable instructions, which when executed by the computer device, further cause the computer device to generate an edit sequence comprising INSERT and DELETE operations to transform the first list into the second list, wherein the subsequence of rules is based on the edit sequence.

14. The non-transitory computer-readable storage medium of claim 13,
wherein the computer executable instructions, which when executed by the computer device, further cause the computer device to use the DELETE operations in the edit sequence to identify the subsequence of rules in the first list.

15. The non-transitory computer-readable storage medium of claim 12,
wherein rules in the merged list that are unique to the first list are identified by a first indicator, rules in the merged list that are unique to the second list are identified by a second indicator, and rules in the merged list that are unique to the subsequence of rules are identified by a third indicator,
wherein installing the merged list includes matching incoming packets only with rules that are identified with the first and third indicators.

16. The non-transitory computer-readable storage medium of claim 12,
wherein deleting rules in the installed merged list includes deleting rules that occur only in the first list in a top-down order.

17. An apparatus comprising:
one or more computer processors; and
a computer-readable storage medium comprising instructions for controlling the one or more computer processors to be operable to:
receive a second list of packet processing rules to replace a first list of packet processing rules previously installed in a memory of a network device;
identify a subsequence of rules common to both the first list and the second list, wherein every rule in the subsequence of rules occurs in both the first list and the second list and the rules in the subsequence of rules occur in the same order as in the first list and in the second list;
create a merged list of rules by combining rules in the first list with rules in the second list that are not also in the subsequence of rules;
install the merged list of rules into a second portion of the memory of the network device that overlaps with a first portion of the memory that stores the first list of rules in a bottom-up order starting from a bottom of the second portion of the memory; and
delete rules in the installed merged list that are unique to the first list, leaving only rules that belong to the second list.

18. The apparatus of claim 17, wherein the computer-readable storage medium further comprises instructions for controlling the one or more computer processors to be operable to generate an edit sequence comprising INSERT and DELETE operations to transform the first list into the second list, wherein the subsequence of rules is based on the edit sequence.

19. The apparatus of claim 18, wherein the computer-readable storage medium further comprises instructions for controlling the one or more computer processors to be operable to use the DELETE operations in the edit sequence to identify the subsequence of rules in the first list.

20. The apparatus of claim 17, wherein rules in the merged list that are unique to the first list are identified by a first indicator, rules in the merged list that are unique to the second list are identified by a second indicator, and rules in the merged list that are unique to the subsequence of rules are identified by a third indicator,
wherein installing the merged list includes matching incoming packets only with rules that are identified with the first and third indicators.

* * * * *